(12) United States Patent
Gildfind

(10) Patent No.: US 9,148,468 B1
(45) Date of Patent: Sep. 29, 2015

(54) DISTRIBUTING SHARED CONTENT

(71) Applicant: Andrew Joseph Alexander Gildfind, London (GB)

(72) Inventor: Andrew Joseph Alexander Gildfind, London (GB)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 13/801,152

(22) Filed: Mar. 13, 2013

(51) Int. Cl.
*G06F 15/16* (2006.01)
*H04L 29/08* (2006.01)

(52) U.S. Cl.
CPC ...................................... *H04L 67/02* (2013.01)

(58) Field of Classification Search
CPC ............................. H04L 67/306; H04L 67/32
USPC ................................................. 709/204, 205
See application file for complete search history.

(56) References Cited

U.S. PATENT DOCUMENTS

| | | | |
|---|---|---|---|
| 7,734,624 B2 | 6/2010 | Anderson et al. | |
| 8,230,456 B2* | 7/2012 | Jacoby et al. | 725/9 |
| 2006/0168616 A1* | 7/2006 | Candelore | 725/34 |
| 2009/0248494 A1 | 10/2009 | Hueter et al. | |
| 2010/0293057 A1 | 11/2010 | Haveliwala et al. | |
| 2012/0215623 A1 | 8/2012 | Ramer et al. | |

* cited by examiner

*Primary Examiner* — Adnan Mirza
(74) *Attorney, Agent, or Firm* — Foley & Lardner LLP; John D. Lanza

(57) ABSTRACT

A system for distributing shared content to an Internet user, includes a data store comprising a computer readable medium storing a program of instructions for performing the distribution of shared content to the Internet user; a processor that executes the program of instructions; a frame management unit to receive a container from a trusted third party source; a data aggregation unit to retrieve information about the Internet user from a plurality of data providers and to aggregate the retrieved information; a vector creation unit to create a vector based on the aggregated retrieved information; a measurement ping generation unit to generate a measurement ping to a measurement server; and a communication unit to communicate the vector to an online shared content network and to receive shared content displayed via the container.

20 Claims, 3 Drawing Sheets

DISTRIBUTING SHARED CONTENT

BACKGROUND

An Internet user employs an application, such as a web browser, to access various web sites. The web browser communicates a universal resource locater (URL) request to a server, the server retrieves content from a content provider based on the requested URL, and delivers the content to the web browser. The content may be sourced from a single source, or be an amalgamation of data from multiple sources.

In certain situations, content may include shared content. The shared content may be provided from the content provider. Alternatively, a third-party provider, such as an online shared content network may provide shared content to be included with content displayed on a web browser.

In order to maximize the effectiveness of the shared content, various techniques may be employed, such as determining the Internet users with the highest likelihood of clicking-through the shared content. If non-germane shared content is provided to the Internet user, the Internet user may not click-through the shared content. Other metrics may be employed to determine if shared content is germane to the user.

Various techniques may be employed to ensure that the shared content served to the Internet user is germane. For example, if the Internet user is viewing content related to sports, a shared content provider may serve shared content related to the purchase of sporting goods.

Alternatively, data associated with the Internet user's web browser may be employed as well to retrieve germane shared content. Web browsers include a cookie. A cookie is a file that records previously visited web sites by the web browser. Thus, the cookie may be viewed as a key to viewing the Internet user's activity associated with a server.

A server, a content provider, or an online shared content network may employ the cookie to serve germane shared content to the Internet user. For example, if the cookie indicates that the web browser accessed a popular retail web site, the online shared content network may serve shared content related to products related to the popular retail web site.

The online shared content network may determine aspects about an Internet user based on the cookie. For example, the online shared content network may determine user preferences and interests associated with the Internet user based on data gleaned from the cookie.

Online social networks may store information about the Internet user, and use this information to serve shared content to the Internet user. For example, the Internet user may indicate certain attributes or preferences about themselves, such as interests, sex, beliefs, or other information that aids in the shared content being selected to be served to the Internet user.

Various other techniques may also be employed that are closely related to analyzing the Internet user's behavior. For example, an online shared content network may employ search terms or keywords entered by the Internet user to selected shared content to be served to the Internet user. Additionally, a social network may contain information about how the various users of the social network communicate and interact with each other.

A third-party may be interested in measuring the effectiveness of the shared content. By measuring the effectiveness of the shared content, an online shared content network may serve the Internet user shared content that will be clicked-through.

In measuring the effectiveness of the shared content, several metrics may be employed. For example, a server measuring the effectiveness of the shared content may monitor a unique number of Internet users who access the server. Alternatively, the server may record the frequency of views for a specific shared content item. Or the server may determine the effectiveness of the shared content by the number of Internet users who click-through the shared content.

Due to the fragmented nature of information, various aspects about the user may be distinctly located at various sources, such as various social networks or other web sites. A cookie may also contain information for more than one user. Thus, serving shared content, while measuring the shared content's effectiveness may be difficult.

SUMMARY

A system and method for distributing shared content to an Internet user. The system includes a data store comprising a computer readable medium storing a program of instructions for performing the distribution of shared content to the Internet user; a processor that executes the program of instructions; a frame management unit to receive a container from a trusted third party source; a data aggregation unit to retrieve information about the Internet user from a plurality of data providers and to aggregate the retrieved information; a vector creation unit to create a vector based on the aggregated retrieved information; a measurement ping generation unit to generate a measurement ping to a measurement server; and a communication unit to communicate to the vector to an online shared content network and to receive shared content displayed via the container.

DESCRIPTION OF THE DRAWINGS

The detailed description refers to the following drawings, in which like numerals refer to like items, and in which.

DETAILED DESCRIPTION

Figure 1:
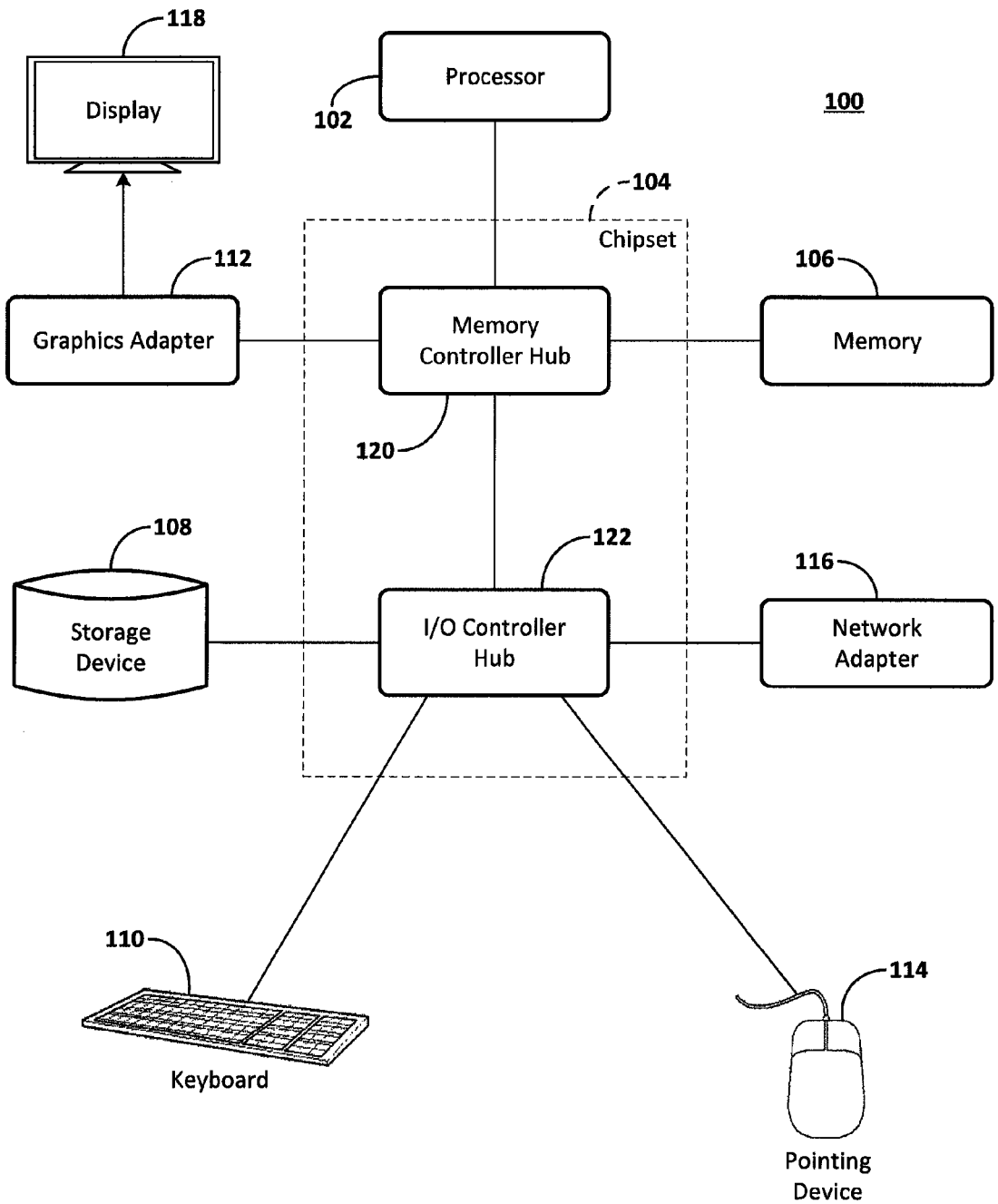
FIG. 1 is a block diagram illustrating an example computer.

An Internet user may interact with an online shared content network and a measurement server in a parallel fashion. In doing so, the Internet user becomes susceptible to information associated with the Internet user's browsing activities being leaked to the online shared content. Because the online shared content network may be privy to the cookies associated with the Internet user, the online shared content network may be able to track the Internet user's previous browsing activities.

Thus, cookies may be prevented from being transmitted to an online shared content network. However, in doing so, the online shared content network may not effectively serve shared content to an Internet user. For example, if the measurement server is cognizant that 50% of all Internet users being served shared content items like "automobiles", an online shared content network may have no capability to direct shared content about automobiles to the individual Internet users who like automobiles. In this way, because shared content relevant to a specific Internet user is not served, the online shared content network does not achieve effective serving of shared content to specific users.

The methods and systems disclosed herein are directed to serving and measuring shared content in an integrated fashion while preserving an Internet user's privacy. The methods and systems disclosed herein allow an online shared content network to retrieve information from a data provider (or multiple data providers), and effectively serve shared content based on the retrieved information to the Internet user.

Further, because the shared content is served via information from the data provider, the Internet user does not transmit any information about the Internet user's browsing activities, such as information gleaned from cookies and other files stored on the Internet user's personal account or devices.

Additionally, after the Internet user is served the shared content, the Internet user then may communicate separately with a measurement server. This ensures that the online shared content network does not interact with the Internet user's PII, or is cognizant of the Internet user's web browsing activities. In this way, the process of serving the shared content based on knowledge about the Internet user, and measurement of the Internet user's shared content viewing may be integrated in a way that does not compromise the Internet user's personal privacy.

In situations in which the systems discussed here collect personal information about users, or may make use of personal information, the users will be provided with an opportunity to control whether programs or features collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user will have control over how information is collected about the user and used by a content server.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. For example, a data store, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
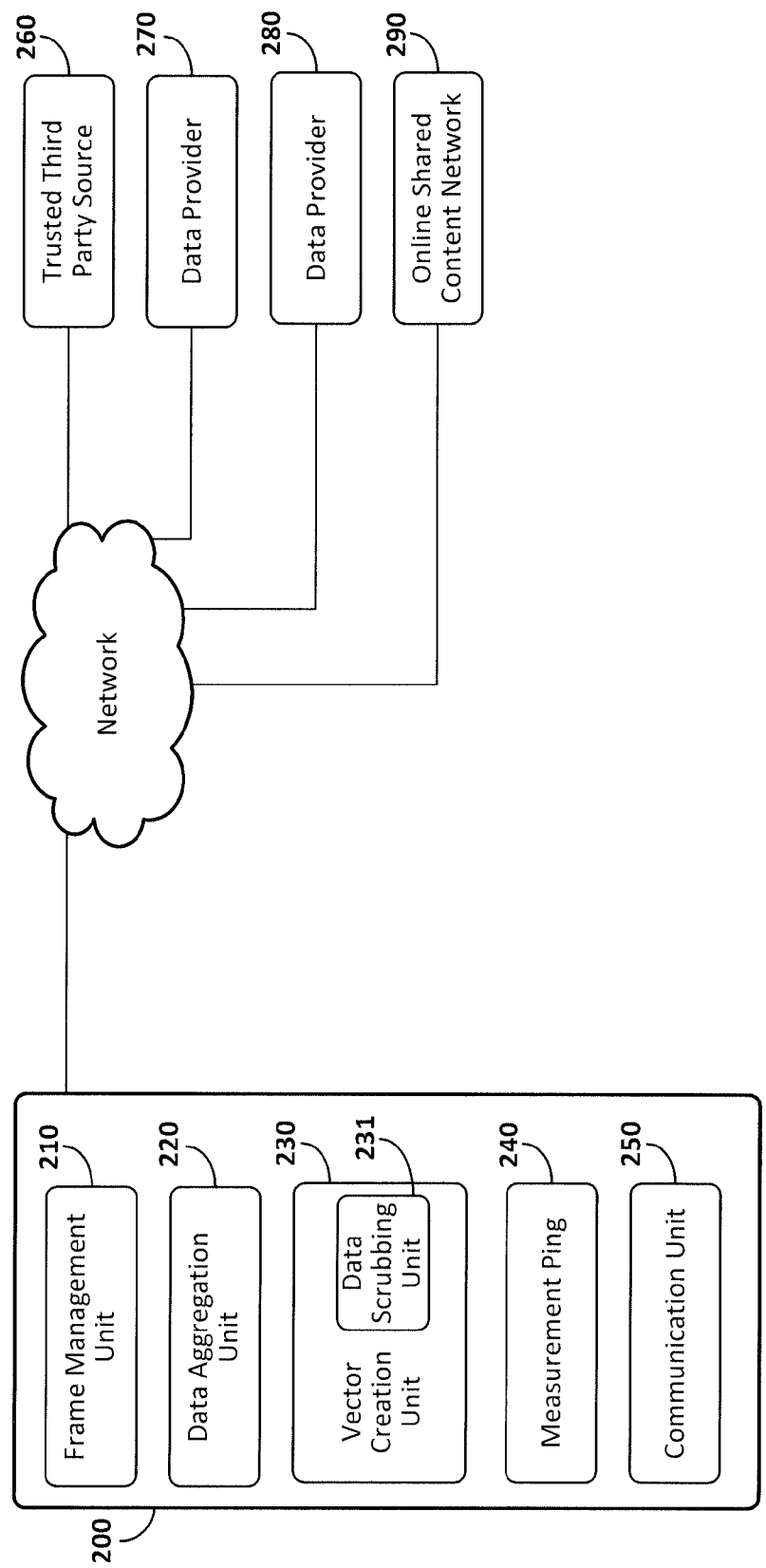
FIG. 2 illustrates an example of a system for distributing shared content via a web browser while ensuring an Internet user's personal identification information is protected.

FIG. 2 illustrates a system for distributing shared content via a web browser while ensuring an Internet user's PII is protected. The system 200 includes a frame management unit 210, a data aggregation unit 220, vector creation unit 230, a measurement ping generation unit 240 and a communication unit 250. The system 200 may be implemented on a device, such as computer 100. The system 200 may be incorporated as part of a web browser, and communicates via a network 255 to a trusted third party source 260, a data provider 270, a data provider 280 and an online share content network 290.

The frame management unit 210 receives an i-frame to display shared content from a trusted third party source 260. The i-frame may serve as a container for instructions to retrieve information from various data providers. The frame management unit 210 may retrieve data used to retrieve shared content while ensuring that the Internet user's PII is not delivered to various third parties, such as the online shared content network 290.

In the example provided in FIG. 2, an i-frame incorporated with a web browser is used for communicating to and from various devices. However, one of ordinary skill in the art may implement system 200 with other sorts of data aggregation and display components. For example, the shared content may be delivered to an Internet television, a smart phone, or a table. Thus, the aspects disclosed in conjunction with system 200 may be employed for these devices as well.

The data aggregation unit 220 aggregates data from various data providers, such as data provider 270 and data provider 280. The data providers may be a social network, a blog, or any web site in which the Internet user provides information about their activities or interests.

For example, if the Internet user is registered and stores information on a social network site 'A', such as sex, interests, or preferences—the data aggregation unit 220 may retrieve and store this information about the Internet user in a data store. The data aggregation unit 220 may store information about multiple data providers associated with the Internet user.

The vector creation unit 230 creates a vector from the information aggregated by the data aggregation unit 220. The vector may contain information about the Internet user, such as their sex, race, interest and activities. The vector may be communicated to a third-party, such as an online shared content network 290, thereby instigating a retrieval of shared content based on the information aggregated about the Internet user.

The vector creation unit 230 includes a data scrubbing unit 231. The data scrubbing unit 231 scrubs PII associated with an Internet user from the vector. Thus, any party that receives the vector may not be able to glean any information about the Internet user associated with the vector.

The measurement ping generation unit 240 transmits a measurement ping to a measurement server (which may be implemented along with the trusted third party source 260). The measurement ping indicates that the shared content retrieved based on the vector is served to the Internet user. Thus, a record of shared content being served to the Internet user is made, while the online shared content network 290 does not receive any information about the PII associated with the Internet user.

The communication unit 250 facilitates communication for the system 200 via network 255. For example, the communication unit 250 may transmit a request to the trusted third party source 260 that sources the i-frame. Further, the communication unit 250 may transmit requests for data from the various data providers 270 and 280, the data being aggregated by the data aggregation unit 220. Once the vector is created by the vector creation unit 230, the communication unit 250 may transmit the vector to the online shared content network 290. The communication unit 250 may receive the shared content from the online shared content network 290.

Alternatively, the vector may be transmitted to a secured proxy. Thus, the vector may be scrubbed of any identifiable attributes, such as a source IP address, a browser used, or the like. In this way, an online shared content network may not be able to use the vector to glean information about a transmitting party associated with the vector.

Figure 3:
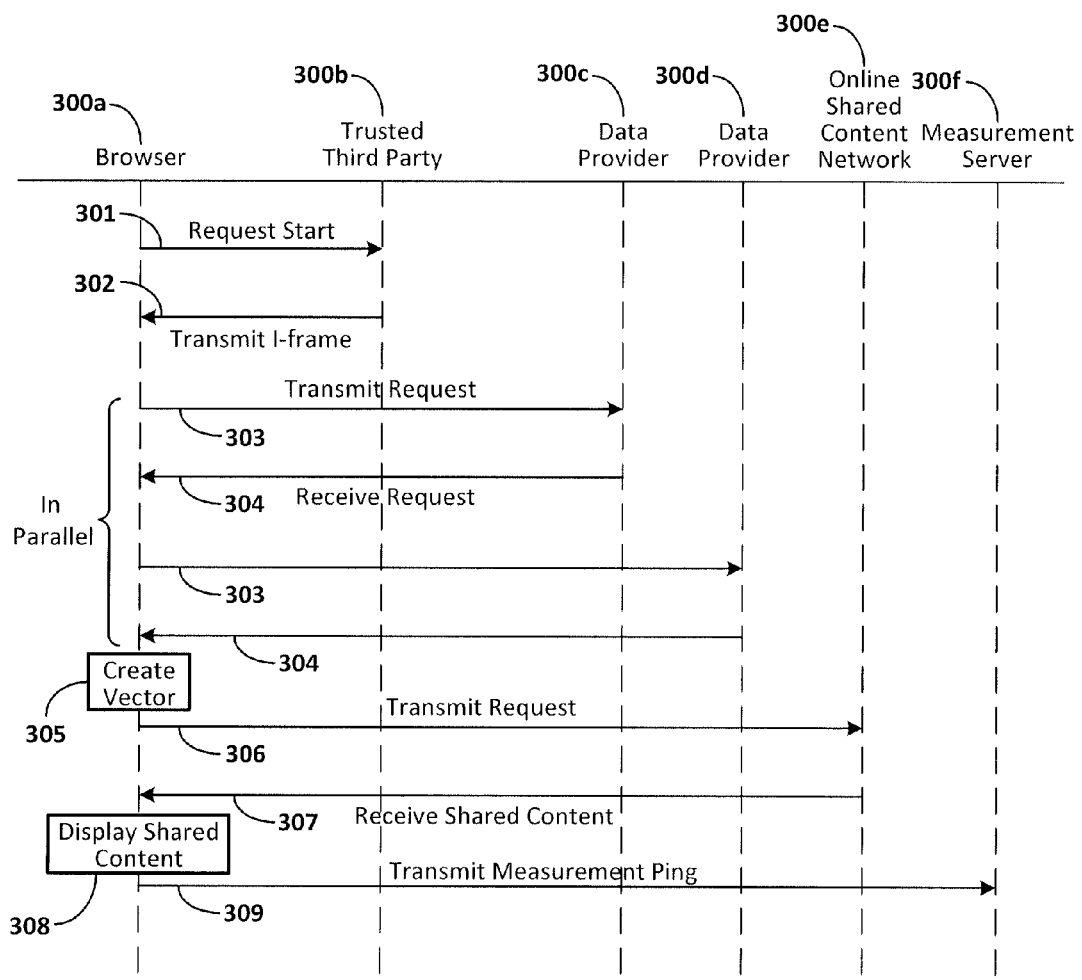
FIG. 3 illustrates an example of a method for distributing shared content via a web browser while ensuring an Internet user's personal identification information is protected.

FIG. 3 illustrates an example of a method 300 for distributing shared content via a web browser while ensuring an Internet user's PII is protected. The method 300 may be implemented on a user client application, such as a web browser or a mobile application. FIG. 3 includes a browser 300a, a trusted third party source 300b, a data provider 300c, a data provider 300d, an online shared content network 300e and a measurement server 300f. In the example shown in FIG. 3, two data providers are shown; however, one of ordinary skill in the art may implement the system 200 to interact with any number of data providers.

In operation 301, a browser 300a generates a request to a trusted third party source 300b. The request instigates the trusted third party source 300b to deliver an i-frame to execute the various aspects described with method 300. The i-frame may execute coded instructions to perform the various operations of method 300. The instructions may be implemented in an object-oriented programming language, such as JavaScript.

In operation 302, the trust third party source 300b transmits the i-frame to the browser 300a. At this juncture, browser 300a may display the i-frame as a window or portion of a web page displayed to the Internet user.

In operation 303, the browser 300a communicates information to one of a plurality of data providers, such as data provider 300c or data provider 300d. The browser 300a may communicate information, such as requests for information about an Internet user associated with browser 300a.

The browser 300a uses the i-frame to communicate the information to a plurality of data providers, such as data provider 300c and data provider 300d. By using the i-frame, the browser 300a ensures that data provider 300c or data provider 300d is not privy to shared content served to the Internet user.

The i-frame may use a programming language, such as JavaScript, to communicate with the various data providers. For example, the i-frame may make asynchronous JavaScript and XML (AJAX) requests to the various data providers in operation 303 to request that the data providers serve the i-frame with information about the Internet user associated with the browser 300a.

The requests sourced from the i-frame to each respective data provider may occur asynchronously. Further, the requests may be sent along with HTTP requests transmitted from the browser 300a to data providers 300c or 300d.

In operation 304, the data provider 300c and data provider 300d may deliver information to the browser 300a based on the request communicated in operation 303. Thus, based on the information requested for in operation 303, the information may be delivered to the browser 300a. The information is labeled as a vector, and contains information about the Internet user stored on the respective data provider in which the information is sourced.

In operation 305, the browser 300a combines the various vectors retrieved in operation 304. In this way, a vector is created that combines the various information pertaining to the Internet user sourced from the data provider 300c and data provider 300d. The browser 300a at this juncture may strip PII from the information created in operation 305. Thus, PII, such as data associated with cookies is not be transmitted with the vector created in operation 304.

In operation 306, the browser 300a transmits the vector created in operation 305 to an online shared content network 300e. The vector identifies various aspects of the Internet user associated with the browser 300a, without delivering cookies associated with the Internet user or the browser 300a. The vector indicates preferences and attributes about the Internet user, without containing any PII associated with the Internet user.

In operation 307, the online shared content network 300e transmits shared content to the browser 300a. The online shared content network 300e determines the shared content to be transmitted based on the vector received in operation 306. The online shared content network 300e may cross-reference the information associated with the vector with a database, and utilize a metric to determine shared content to serve to the Internet user associated with the browser 300a. Thus, by transmitting relevant shared content, the Internet user associated with browser 300a is more likely to click-through the shared content.

The shared content is displayed in the i-frame created in operation 301. By displaying the shared content in the i-frame, knowledge of the shared content is prohibited from non-authorized sources. Thus, data providers, such as data providers 300c and 300d, may not be privy to the shared content served to the i-frame. Further, non-trusted third party sources, such as non-authorized ratings agencies, may also not be privy to the shared content. Thus, according to method 300, knowledge of the Internet user viewing the shared content may be shared exclusively with the trusted third party source 300b.

At operation 309, the browser 300a transmits a measurement ping to a measurement server 300f. The measurement ping serves as a recordation of the shared content being viewed by an Internet user associated with browser 300a. Thus, the measurement server 300f may be able to record data associated with the viewing of shared content.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

I claim:

1. A system for distributing shared content to an Internet user, comprising:
    a data store comprising a non-transitory computer readable medium storing a program of instructions for performing the distribution of the shared content to the Internet user;
    a processor that executes the program of instructions;
    a frame management unit to receive a container for instructions from a trusted third party source;
    a data aggregation unit to request information about the Internet user from a plurality of data providers and to aggregate the retrieved information;
    a vector creation unit to create a vector based on the aggregated retrieved information, the vector creation unit comprising a data scrubbing unit to remove personal identification information (PII) from the vector;
    a measurement ping generation unit to generate a measurement ping to a measurement server; and
    a communication unit to communicate the vector to an online shared content network and to receive shared content displayed via the container.

2. The system according to claim 1, wherein the information about the Internet user comprises demographic information, or geographic location.

3. The system according to claim 1, wherein the container executes instructions coded in JavaScript.

4. The system according to claim 1, wherein the data aggregation unit communicates with the plurality of data providers via asynchronous JavaScript and XML (AJAX) requests.

5. The system according to claim 4, wherein at least one of the plurality of data providers is a social network.

6. The system according to claim 4, wherein the shared content is associated with a click-through link.

7. The system according to claim 1, wherein the data scrubbing unit is further configured to remove cookies associated the web browser from the vector.

8. The system according to claim 1, wherein the measurement server is an online ratings agency.

9. The system according to claim 4, wherein the data aggregation unit aggregates retrieved information from the plurality of data providers.

10. A method implemented on a processor for distributing shared content to an Internet user, comprising:
generating a request, using the processor, to a trusted third party source for a container for instructions;
receiving, by a frame management unit executed by the processor, the container from the trusted third party source;
communicating, by a data aggregation unit executed by the processor, to a first data provider and a second data provider a request for information about the user;
receiving, by the data aggregation unit, from at least one of the first data provider and the second data provider, information about the Internet user;
aggregating, by the data aggregation unit, the information about the Internet user into a vector;
removing, by a data scrubbing unit executed by the processor, personal identification information (PII) from the vector;
transmitting, by a communication unit of the processor, the vector to an online shared content network;
receiving, by the communication unit, shared content from the online shared content network;
transmitting, by the communication unit, a measurement ping generated by a measurement ping generation unit executed by the processor to a measurement server; and
displaying the shared content via the container.

11. The method according to claim 10, wherein the information about the Internet user comprises demographic information, or geographic location.

12. The method according to claim 10, wherein the container executes instructions coded in JavaScript.

13. The method according to claim 10, wherein the web browser communicates to the first data provider and the second data provider asynchronous JavaScript and XML (AJAX) requests.

14. The method according to claim 13, wherein at least one of the first data provider or the second data provider is a social network.

15. The method according to claim 13, wherein the shared content is associated with a click-through link.

16. The method according to claim 10, wherein aggregating the information about the Internet user into the vector further compromises removing cookies associated with the web browser from the vector.

17. The method according to claim 10, wherein the measurement server is associated with an online ratings agency.

18. The method according to claim 13, wherein the vector includes information about the Internet user from one of the first data provider and the second data provider.

19. A method implemented on a processor for distributing shared content to an Internet user, comprising:
generating a request, using the processor, to a trusted third party source for a container for instructions;
receiving, using the processor, the container from the trusted third party source;
communicating, using the processor, to a first data provider and a second data provider a request for information about the user;
receiving, using the processor, from the first data provider and the second data provider, information about the Internet user;
aggregating, using the processor, the information about the Internet user into a vector;
removing, using the processor, personal identification information (PII) from the vector;
transmitting from the web browser, using the processor, the vector to an online shared content network;
receiving, using the processor, shared content from the online shared content network; and
displaying the shared content via the container.

20. The method according to claim 19, wherein the information about the Internet user comprises demographic information, or geographic location.

* * * * *